United States Patent [19]

Bata et al.

[11] 4,184,633
[45] Jan. 22, 1980

[54] BIMETAL CONTROLLED ACTUATOR

[75] Inventors: George T. Bata, Grafgon; Van P. Spiker, Newport News; Patrick D. Harper, Seaford, all of Va.

[73] Assignee: The Bendix Corporation, Southfield, Mich.

[21] Appl. No.: 833,407

[22] Filed: Sep. 15, 1977

[51] Int. Cl.² ............ G05D 15/00; G05D 23/00
[52] U.S. Cl. ............................ 236/68 R; 236/87
[58] Field of Search ............. 236/68 R, 87, 84; 251/11; 237/2 A; 337/105

[56] References Cited

U.S. PATENT DOCUMENTS

| | | | |
|---|---|---|---|
| 1,856,586 | 5/1932 | Persons | 236/68 R |
| 1,880,743 | 10/1932 | Botts | 337/105 X |
| 2,122,050 | 6/1938 | Stuart | 236/68 R |
| 2,350,403 | 6/1944 | Kulka | 337/105 X |
| 3,286,922 | 11/1966 | Franz | 236/101 E |
| 3,819,146 | 6/1974 | Dobson | 236/101 F |
| 3,877,638 | 4/1975 | Amano et al. | 236/87 X |

*Primary Examiner*—William E. Wayner
*Attorney, Agent, or Firm*—Markell Seitzman; Russel C. Wells

[57] ABSTRACT

A pressure transducer is disclosed which produces a variable fluid pressure level in correspondence with the level of a varying electrical signal. The particular application of the pressure transducer disclosed is for a vacuum modulator for producing a variable level vacuum pressure for operating an actuator utilized to position a blend air door in an automatic temperature control system for automotive passenger compartments. The pressure variation is accomplished by controlled communication of either a low pressure or a high pressure source with an interior chamber of the transducer housing, such controlled communication being produced by a pair of heated bimetal actuator devices, each including a bimetal arm which is normally biased to seal the respective inlet port associated with each of the low pressure and high pressure sources. One or the other of the bimetal arms is heated if the pressure level differs from the level corresponding to the electrical signal value by means of a bimetal heater circuit associated with each bimetal arm with the varying electrical signal to be transduced causing activation of the heater current in one or the other respective bimetal heater circuit depending on whether the pressure level is to be increased or decreased, until the pressure level reaches the corresponding level to that of the electrical signal. The electrical signal is disclosed as an error signal in an automatic control system which causes either a vacuum pressure or atmospheric vent port to be placed in communication with the interior chamber of the pressure transducer housing so as to either increase or decrease the vacuum pressure within the enclosure.

16 Claims, 5 Drawing Figures

BIMETAL CONTROLLED ACTUATOR

BACKGROUND OF THE INVENTION

1. Field of the Invention

This invention concerns pressure transducer arrangements in which an electrical signal is utilized to produce a corresponding fluid pressure level and the application of such a pressure transducer to an automatic temperature control system for automotive passenger compartment temperature controls.

2. Description of the Prior Art

Automatic temperature control systems of the type utilized in modern day automotive vehicles commonly use a combined air cooling and heating of circulated air in order to maintain temperature levels within the passenger compartment at selected levels. These systems typically use air ducting through which an air flow is directed by means of a blower, the air flow passing first over an air conditioner evaporator coil to initially cool the air mass flowing through the duct, the air flow then being directed to a diverter box which proportions the air flow between a bypass duct passage and a heater passge in which is disposed the heater core. A variably positioned blend air door proportions the quantity of air passing into either the bypass duct or the heater duct so as to control the temperature of the air mass flowing through the ducting, the air flow then passing into the passenger compartment.

The temperature control is carried out by means of a manual temperature selector device such as a rheostat and a passenger compartment temperature sensor such as a thermistor, both of which produce electrical signals corresponding to the desired temperature level and the sensed temperature level, respectively. Upon development of a temperature error signal indicating a difference between the selected temperature and the actual temperature, an electrical error signal is produced as by a differential amplifier, the error signal having a sense corresponding to the direction of the error, i.e., either above or below the manually selected temperature level. This electrical error signal is typically applied to a vacuum modulator device which generates a vacuum pressure level corresponding to the error signal which vacuum pressure is utilized to properly position the blend air door by means of a vacuum operated actuator. The system variables are calibrated such that the change in position of the blend air door increases or decreases the temperature of the air flow within the ducting system so as to correct the temperature level in the passenger compartment.

That is, for a relatively great sensed temperature level above the selected temperature level, the vacuum pressure is adjusted to cause the blend air door to assume a position whereby most or all of the air flow is directed through the bypass duct and maximum cool air is circulated into the passenger compartment. Conversely, if the sensed temperature level is below that selected, the blend air door position is adjusted to increase the air flow past the heater core to increase the temperature of the air passing into the passenger compartment to correct the temperature differential.

The degree of the error signal in either sense determines the extent of movement of the blend air door in the direction tending to correct the temperature difference condition.

In some conventional prior art systems, the modulator device utilizes a movable member which generates a force corresponding to the electrical error signal, which acts against a pressure responsive diaphragm member such as to create a force stabilized pressure regulator. These arrangements produce a pressure corresponding to the magnitude of the error signal typically by use of a metering valve which opens to allow the diaphragm chamber to be in communication with a low pressure source such as the engine manifold. Such a system is disclosed in U.S. Pat. No. 3,877,638 to Amano et al.

A difficulty with such an approach is that the pressure levels achieved demonstrate considerable variations for variations in the vacuum source pressure. Also, the electrical error signal must generate a force which is not inconsiderable to balance the force generated by the change in pressure within the modulator, to slow the system response due to the thermal inertia of the parts involved if thermal effects are utilized. The response to the system is further slowed since the approach inherently involves the controlled communication of the low pressure source within the enclosure within which the pressure level is to be regulated such that changes in pressure to the actuator could not be changed by applying full vacuum.

Such a force stabilized system has been deemed by those working in the art to be necessary since the use of a temperature feedback to control the stabilization of the control loop was impossible to stabilize due to the long time lag between the movement of the blend air door and the achieving of the reduction or increase in the temperature level of the passenger compartment such that as a practical matter such control systems could not be stabilized with a thermal feedback. Accordingly, the error signal had to be stabilized directly by means of a force produced by the change in pressure or some such similar solution.

In the Weaver et at Pat. No. RE 27,699, an improvement to such systems is disclosed in that a pressure transducer device is utilized as a vacuum modulator in which the vacuum modulator does not involve the use of large pressure created forces. Rather, a movable core is moved linearly with respect to the error signal and free communication with an interior space within which the pressure is to be developed is created to provide a very rapid generation of the new corresponding pressure level upon development of an error signal. This system is stabilized with a position feedback potentiometer associated with the blend air door which generates an electrical signal corresponding to the desired position of the blend air door in correspondence with the sense and degree of the error signal. The system has proved to be highly satisfactory inasmuch as the response of the system is much improved and quickly stabilizes the modulated vacuum pressure. This new vacuum pressure level is very quickly achieved since open communication between the low pressure source and the interior of the modulator is distinguished from the approach typified by the Amano et al patent mentioned above.

However, the pressure regulator device shown in the Weaver et al patent, while highly satisfactory in performance, suffers from its relative complexity and high cost of manufacture, which element adds significantly to the cost of the system.

In the Amano et al patent, there is disclosed the use of a heated bimetal to produce a force which corresponds to the electrical error signal. As described above, this basis system has certain drawbacks due to the force balance principle involved, in which relatively high force levels must be generated by the bimetal elements. However, a heated bimetal device does produce a convenient and effective way of converting an electrical signal into mechanical movement and could be utilized in a system such as the Weaver et al patent to provide a simple communication of a pressure or vacuum port with an interior enclosure. The difficulty in achieving such an application for this device would be in producing a satisfactory response from the heated bimetal without creating the danger of incidental overheating of the bimetal and/or erratic performance thereof. That is, if relatively large heating currents were utilized over a period of time in order to quickly heat the bimetal element to enhance its responsiveness, such large currents would be difficult to properly relate to the specifics of the bimetal element without destroying or degrading the element. On the other hand, if lower currents were utilized, excessive time periods of response would likely be encountered and the slope of the time-deflection curve would be too shallow for adequate response particularly for such applications as described above.

Also, the relationship between the heating circuit current and the bimetal would be difficult to design if such design was constrained by the steady state or continuous operation temperature levels achieved by the heating circuit. Furthermore, the larger deflections associated with large temperature current levels would reduce the return response of the bimetal arm since the deflection would be relatively gross and temperature levels high and considerable time period would be required in order to cool the bimetal to a point where it would again seat on the control port. These difficulties would prevent the application of such simple heated bimetal elements to applications such as the vacuum modulator device shown in the above-referenced Weaver et al patent.

Accordingly, it is an object of the present invention to provide a heated bimetal actuator device for application as a pressure or vacuum port communication control which the response movement of the bimetal both in the opening and closing movements are very rapid.

It is yet another object of the present invention to provide a pressure transducing arrangement utilizing such heated bimetal which generates a pressure level corresponding to an electrical signal.

It is still another object of the present invention to provide such a pressure transducing arrangement suitable for use as a vacuum modulator device in which intermittent communication of an interior chamber with a vacuum source is carried out in order to control and generate a controlled vacuum pressure level within the chamber.

It is still another object of the present invention to provide a pressure transducing arrangement incorporated in a vacuum modulation device combined with an automatic temperature control system of the type described.

SUMMARY OF THE INVENTION

These and other objects, which will become apparent upon a reading of the following specification and claim, are accomplished by a pressure transducing arrangement utilizing a bimetal actuator device in which a bimetal arm is biased into a rest position and is caused to move away from the rest position by means of a bimetal heater circuit associated with the bimetal arm which is activated in the presence of an electrical control signal.

The device further includes a heater interrupter means activated by contact positioned proximate to the bimetal arm and adapted to interrupt the heater circuit to discontinue heating of the bimetal arm after predetermined extent of movement of the bimetal arm induced by the heating. If the electrical signal is still present after a slight movement of the bimetal element away from the interrupter contact, the bimetal heater circuit is activated to cause the arm to again move into contact with the interrupter contact. This provides continued intermittent heating of the bimetal element until the control signal is satisfied. The pressure transducing is carried out by means of a valving actuation performed by the bimetal arm in which communication is established between an inlet port connected to a pressure source and an interior chamber of the transducer to change the pressure level in the chamber to a degree dependent on the duration of the time the inlet port is open, the pressure level being sensed to discontinue the actuation of the bimetal arm upon achieving of the proper pressure level. The heated bimetal element may be applied to a vacuum modulation device in which a pair of the bimetal elements are provided, each controlling communication of a sealed enclosure with a low pressure or vacuum source and a high pressure or atmospheric vent source respectively, with each bimetal element being cantilevered and with its free end biased into engagement with one of the ports. The heating circuit causes movement of the free end of each of the bimetal arms away from each of the respective ports upon receipt of an electrical signal to cause the enclosure pressure to be raised or lowered by placing either the vacuum or vent ports in full communication with the transducer enclosure.

DETAILED DESCRIPTION

In the following specification, a particular embodiment will be described in accordance with the requirements of 35 USC 112 and specific terminology utilized in the interest of clarity. However, it is to be understood that the same is intended to be merely illustrative and is not intended to be limiting inasmuch as the invention is capable of taking many forms and variations within the scope of the appended claims.

As noted, the pressure transducer according to the present invention is contemplated for use within an automatic temperature control system in which a vacuum operated actuator is utilized to correct errors in temperature within an enclosure between a selected temperature and a sensed temperature. The electrical error signals generated are converted into a corresponding vacuum pressure level which in turn properly position the actuator. Such an automatic temperature control system is here briefly described in order to fully set forth the the advantages accruing from the pressure transducing arrangement to be described herein.

Figure 1:
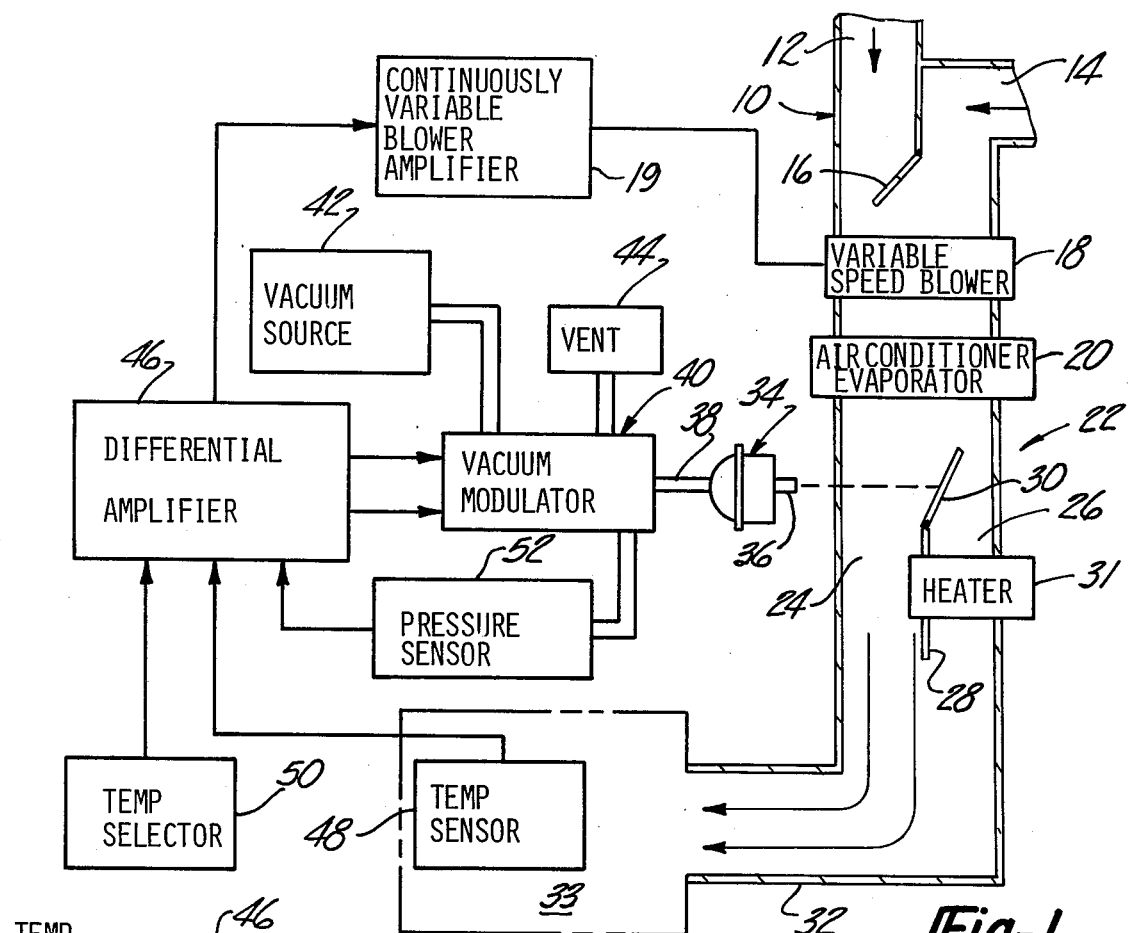
FIG. 1 is a diagrammatic representation of an automatic temperature control system in which the pressure transducer according to the present invention is incorporated.

Referring to the drawings and particularly FIG. 1, the pressure transducer according to the present invention has been developed for special application to the above-described automatic temperature control systems for enclosures such as passenger compartments of automotive vehicles. Such automotive type systems typically comprise a ducting system 10 for drawing in a mixture of outside air and compartment air through respective duct passages 12 and 14.

A damper 16 is often provided to control the proportion of outside and inside air drawn into the system depending on the conditions of operation. For example, when the passenger compartment has become heated by the vehicle having been parked with the windows closed in warm weather, maximum cooling effects of the heater or air conditioner dictates that only compartment air be circulated through the ducting system 10 in order to speed the cooling of the passenger compartment to more comfortable levels.

The air is circulated by means of a blower 18 which may be of variable speed type controlled either manually and/or by the system controls via blower amplifier 19 to adapt the air mass flow to varying system requirements in accordance with well-known control features of the system. The air thus inducted is directed through the ducting 10 and through the air conditioner evaporator coil 20, which is located within the ducting 10 and which receives the liquified refrigerant from the air conditioning system so as to provide a means to cool the air flowing within the ducting 10.

The air flow is directed after cooling to a diverter box portion 22 of the ducting 10 which is comprised of a pair of branching duct passages, a bypass duct 24 and heater duct 26 separated by means of a partition 28. The air flow is proportioned between the bypass duct 24 and the heater duct 26 by means of a movable blend air door 30 which can be positioned so as to proportion the air flow either entirely through the bypass duct 24, or entirely through the heater duct 26 or any proportion in between.

The heater core 31 which may receive hot water from the engine cooling system is mounted in the heater duct 26 and provides means to reheat the cooled air which flows through the heat duct 26.

Thus, the position of the air blend door 30 controls the temperature of the air downstream of the diverter box 22 in the lower ducting 32 which communicates with the outlet ducting within the passenger compartment represented by the rectangle 33.

The cooled air passing out of the air conditioner evaporator coil 20 is unheated when the blend air door 30 is in the position divering maximum flow to the bypass duct 24, and when the blend air door is in the opposite position, creating maximum flow diverted to the heater duct 26, the temperature of the air in the downstream ducting 32 is at a maximum. The speed with which the temperature level in the passenger compartment 33 will be changed is thus varied by the proportioning of the air mass flow by the blend air door 30. These systems use this capability to generally provide for more rapid heating or cooling depending on the degree of temperature level difference between the desired and the actual sensed temperature level in the passenger compartment 33.

The position of the blend air door 30 is determined by a vacuum operated actuator mechanism 34 which has an output member 36 mechanically linked to the air blend door 30. The vacuum operated actuator 34 is of a type which is responsive to a modulated engine vacuum pressure applied via line 38 acting against atmospheric pressure to vary the position of the output member 36 in correspondence with the pressure in line 38. The pressure in line 38 in turn is controlled by a pressure transducer here taking the form of a vacuum modulator 40 which controls the communication of the interior chamber of a hermetically sealed enclosure with a source of low pressure air, i.e., below atmospheric level such as the engine intake manifold, and with a vent passage 44 in communication with a relatively high pressure source, i.e., atmospheric pressure. This establishes a variable pressure in line 38 which varies between levels at or below atmospheric, so as to determine the position of the output member 36.

The communication of the vacuum pressure source 42 and vent 44 with the interior chamber of the vacuum modulator 40 is in turn controlled by electrical error signals received from a differential amplifier 46 which receives electrical signals from a passenger compartment temperature sensor 48, a manual temperature selector 50 and a pressure sensor 52 which senses the pressure produced within the vacuum modulator 40 by virtue of intermittent and alternate communication with the low pressure source 42 or the vent 44.

The passenger compartment temperature sensor 48 is placed to sense the actual temperature of the interior of the passenger compartment at an appropriate location such as in the dash controls of the temperature control system and generates an electrical signal corresponding to the sensed temperature.

The manual temperature selector 50 is that part of the temperature controls in which a desired temperature level may be manually set in by the passenger and may take the form of rheostat or other suitable device so as to generate an electrical signal corresponding to the desired temperature.

The pressure sensor 52 similarly is responsive to the pressure level in the passage 38 and generates electrical control signals corresponding thereto.

Each of these elements may be of conventional design, and since many suitable devices are available, details of the same are not here included.

These signals are summed and amplified within the differential amplifier 46 to produce an error signal which causes either the vacuum source 42 or the vent 44 to be placed in communication with the interior vacuum modulator 40 for a time interval of sufficient duration to vary the pressure in accordance with the sense of the error signal. The vacuum operated actuator 34 responsive to the new pressure level causes the blend air door 30 to assume a position corresponding to an appropriate change in the temperature of the air passing into the ducting 32 in order to produce the temperature correction.

The electrical signals generated by the passenger compartment sensor 40, the manual temperature selector 50 and the response produced in the vacuum modulator are appropriately calibrated such that for each temperature error signal produced by a difference in the selected temperature and the sensed temperature, there is a corresponding position of the blend air door 30, which position in turn corresponds to a modulated vacuum pressure with the passage 38 deemed by the pressure transducer 32. Thus, the temperature error signal causes an appropriate control of the vacuum modulator 40 to either increase or decrease the pressure within the vacuum modulator 40. Once this pressure has been achieved, the temperature error signal corresponding to the difference between the selected temperature and the compartment temperature produces an electrical error signal. This error signal is nulled by the feedback signal generated by the sensed change in pressure within the vacuum modulator produced by the actuation of the vacuum modulator valves by the temperature error signal. Thus, the blend air door 30 will assume a position corresponding to the magnitude of the temperature error signal such as to tend to reduce the error signal, i.e., to direct a large proportion of cooled air into the passenger compartment to reduce the passenger compartment temperature if the temperature is above that selected.

Figure 2:
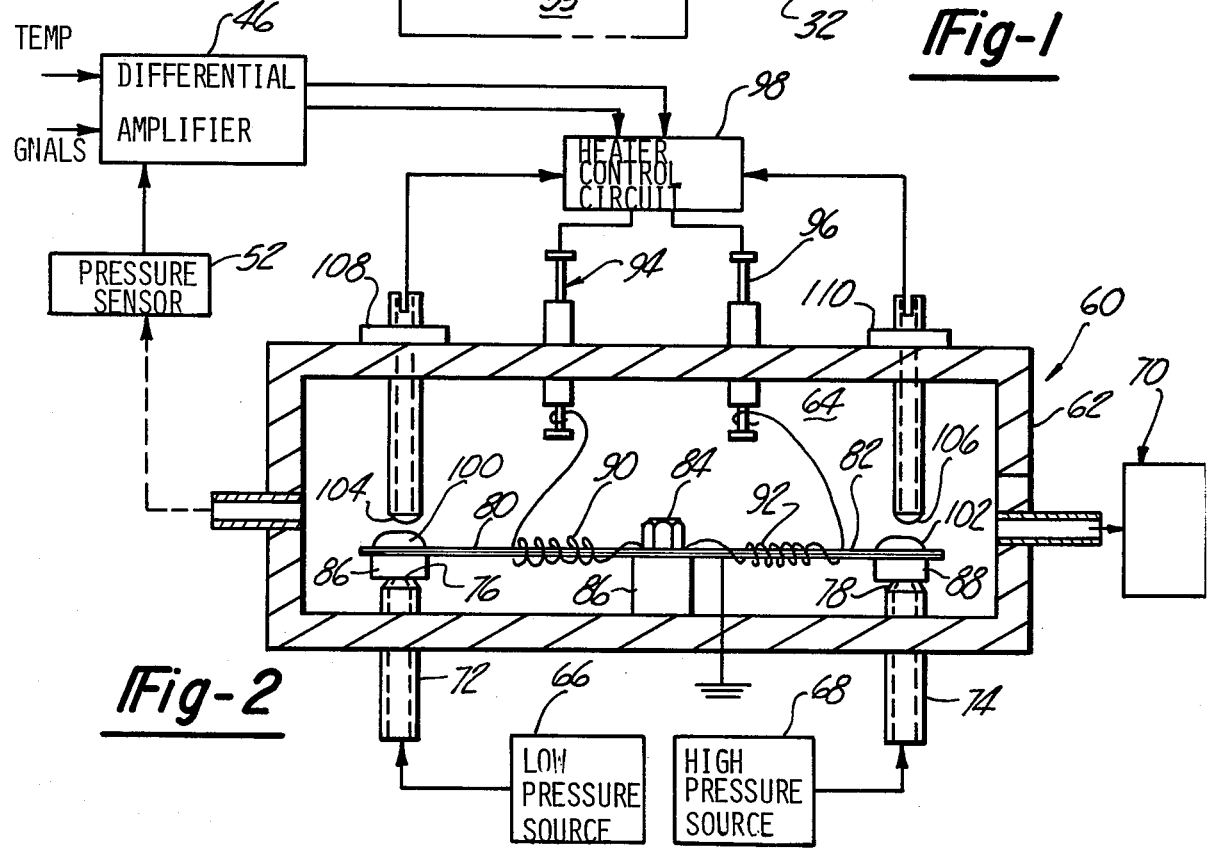
FIG. 2 is a partially sectional view of a pressure transducer according to the present invention.

The vacuum modulator 40, as shown in FIG. 1, utilizes a pressure transducer according to the present invention which is shown as applied to a vacuum modulator in FIG. 2. As a vacuum modulator, the pressure level varies below atmospheric but it is to be understood that the pressure transducer according to the present invention may be applied as well as to other pressure ranges.

The pressure transducer 60 includes a hermetically sealed enclosure 62, the interior chamber 64 of which is to be pressurized at a pressure value corresponding to the level of the varying electrical signal generated by the differential amplifier. This pressure is controlled by intermittent communication between a low pressure, i.e., vacuum source 66 and a relatively high pressure or atmospheric vent source 68. The pressure within the interior chamber 64 is caused to vary between the pressure value of the low pressure or vacuum source 66 and the high pressure or vent source 68 such as to be variable within the range intermediate these pressure values by time-controlled full communication of the interior chamber 64 with one or the other of the sources 66 and 68. The utilization device 70 is in communication with the interior chamber 64 as shown and would be comprised of the vacuum operated actuator 34 shown in the system of FIG. 1.

In the contemplated application of the pressure transducer 60, the controlled communication of the low pressure source 66 and the high pressure source 68 is carried out by means of an interrupted current heated bimetal actuator device which lies at the heart of the transducer principle according to the present invention. This device acts to control the communication of the respective inlet ports 72 and 74 associated with the vacuum source 66 and high pressure source 68 passing into the interior chamber 64, each having a port opening, 76 and 78, respectively. Each of the interrupter current heated bimetal actuator devices are comprised of bimetal arms 80 and 82, both of which may be provided by a single bimetal strip secured at its center 84 by a cap screw seated in a pedestal 86. Each of the bimetal arms 80 and 82 are thus cantilevered out from the mounting pedestal 86. Each of the bimetal arms 80 and 82 carries a valve seat 86 and 88 respectively which may be of a resilient material, adapted to sealingly engage the port 76 and 78, respectively.

The bimetal arms 80 and 82 are both configured so as to be biased into sealing engagement with its associated port 76 and 78 throughout the range of ambient temperatures and to a temperature level substantially above ambient (i.e., 160° F.) to allow proper return response of the bimetal arms 80 and 82 after cessation of a heating current which is utilized to actuate the bimetal arms as will be described further herein. Thus, in the normal or rest state, the port openings 76 and 78 are sealed against communication with either the vacuum source 66 or the vent source 68.

In order to create movement of each of the bimetal arms 80 and 82 to place one or the other of the sources 66 or 68 into communication with the interior chamber 64, bimetal heater windings 90 and 92 are provided, passing around each of the bimetal arms 80 and 82, respectively, which heater windings are of suitable resistance such that when a current is caused to pass through the windings 90 or 92, the bimetal arms 80 or 82 is heated. As is well known, the relative difference in the coefficient of thermal expansion of the materials comprising the bimetal causes a curving deflection of the bimetal arms 80 or 82 in a direction such as to cause it to move away from the associated port 76 and 78, allowing full communication with the interior chamber 64.

It is of course understood that only one or other of the bimetal actuating devices is activated at any given time, since the pressure value moves either upwardly or downwardly in correspondence with the error signal, requiring a pressure adjustment either upwardly or downwardly.

Figure 3A:
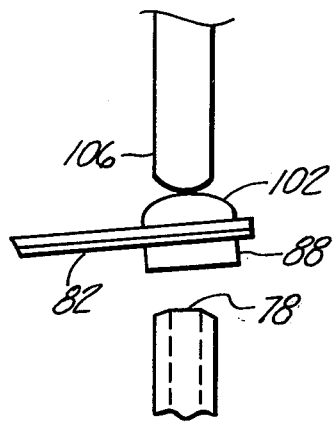
FIG. 3A is a fragmentary view of a bimetal arm incorporated in the pressure transducer shown in FIG. 2, in which the bimetal arm has moved into contact with the interrupter contact.
Figure 3B:
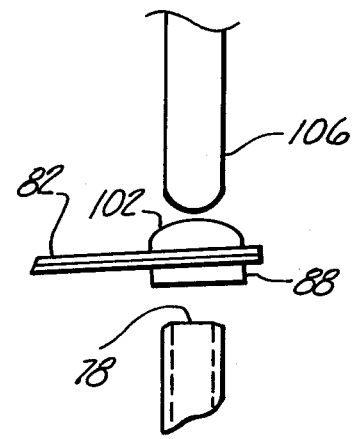
FIG. 3B is a view of the bimetal arm portion shown in FIG. 3A after slight return movement of the arm caused by interruption of the heater circuit.

Each of the bimetal arms 80 and 82 have an associated heater circuit input terminal 94 and 96 through which the current is supplied from a heater control circuitry 98 to be described in detail hereinafter. The heater windings 90 and 92 would be grounded at their other end as shown in FIG. 2. Each of the bimetal arms 80 and 82 also has a heater interrupter contact 100 and 102 positioned to engage a mating interrupter contact 104 and 106, respectively, positioned on each of the bimetal arms 80 and 82 at the outer ends thereof in approximate alignment with the valve seats 86 and 88. After a predetermined deflection of either of the bimetal arms 80 or 82, engagement of the contact sets 100, 104 or 102, 106 creates an interruption of the associated heater circuit of either arm 80 or 82 such as to discontinue further heating. This discontinuance of heating allows the bimetal arm 80 or 82 to cool sufficiently such that it will move slightly away from the associated contact as indicated in FIGS. 3A and 3B.

If the pressure level has not changed to be in correspondence with the input electrical signal by the interval during which the port has been opened, the heater will again be energized upon this slight movement away, such that the bimetal arm 80 or 82 will again be heated to move outwardly into contact with the interrupter contact 100 or 102, allowing continued opening of its associated port 76 or 78, until the pressure level corresponding to the input electrical signal is achieved. At this point, the heating of the bimetal arms 80 or 82 will be discontinued, producing a sealing re-engagement of the respective valve seat 86 or 88 with the port opening 76 or 78 and stabilization of the pressure within the interior chamber 64 at the new pressure level.

The response of the heated bimetal interrupted circuit actuator devices, of course, controls the over response of the pressure transducer. Accordingly, the heating currents selected and the thermal and deflection characteristics of the bimetal arm are of paramount concern in the design of such devices for a particular application and response requirements. Obviously, the mass, conductivity and other heat transfer characteristics of the bimetal arm 80 or 82 affects the rate at which they may be heated and from which the heat may dissipate, as well as the heat transfer characteristics of the mounting arrangement, as would be magnitude of the heating currents and other characteristics of the heater circuits. Such design requirements will of course vary with the particular application.

The temperature at which each of the bimetal arms 80 and 82 would again move into the position shown in FIG. 2 with a sealing pressure exerted on the port 76 and 78 is selected to be well above the ambient temperature level if the response to discontinuance of the heating circuit is to be maximized. That is, upon cooling to some relatively elevated temperature on the order of 160° F., but well below the maximum temperature to which the bimetal arm would be heated, i.e., 300° F.

Each of the heater interrupter contacts 100 and 102 may be threadably mounted by means of insulated bushings 108 and 110 to adjust the distance that the respective bimetal arm 80 or 82 must deflect in order to contact the same in order to provide some adjustability in response of the system.

In operation, if the applied electrical signal value changes such that the pressure level in the chamber 64 does not correspond to the level of the electrical signal, i.e., the pressure must be raised, the heater circuitry will be activated to cause heating of the bimetal arm 82 causing deflection thereof away from the port 78 so as to allow full communication of the high pressure source 68 with the interior chamber 64. This heating continues until the contact 106 moves into engagement with the interrupter contact 102 interrupting the heating circuit. If at this point, the correspondence between the electrical signal and the new pressure value is sensed by the pressure sensor 52, it is not in correspondence with the error signals. The bimetal arm 82 will dither slightly into and out of engagement with contact 102 while continuing to allow full communication of the vent source 68 via port opening 78 until the pressure level is brought into correspondence with the electrical signal value. The demands of the actuator will of course affect the time period required to bring the pressure level into balance with the input electrical signal. This condition is sensed by the pressure sensor 52 and the differential amplifier, which discontinues the control signal calling for energization of the heater circuit 98 upon achievement of the proper pressure level.

At that point, the bimetal arm 82 will be allowed to cool to re-establish sealing engagement with the port opening 78 to thus stabilize the pressure level existing in the interior chamber 64.

It will be appreciated that the bimetal actuation device disclosed in which the heater current is momentarily interrupted without discontinuance of the control or actuation function of the device, i.e., continued open condition of the port, provides a considerable improvement over bimetal devices as has heretofore been utilized. That is, a relatively heavy heater circuit current may be utilized to provide a rapid heating of the bimetal element and improve its response without the danger of either destroying the bimetal element or affecting its useful life. In addition, the full deflected position of the bimetal arm remains in relatively close proximity to its rest position such that the response of the bimetal element to cessation of the heater current may be much improved over the situation at which the bimetal element is heated with high heater current and allowed to move to a relatively extreme position. The bimetal arm, according to the present invention, would stabilize at a much lower temperature level even though high heater currents are utilized. The ease with which a proper design of the arm may be achieved is also much simplified since proper end point conditions are not nearly so difficult to obtain as the heater current is interrupted upon heating beyond a predetermined level, which level can be easily controlled by design of the device.

It should further be noted that this mode of operation of the bimetal actuating device is also inherently compatible with the control concept of the aforementioned Weaver et al patent in which full vent or full vacuum porting to the modulator chamber and actuator is accomplished to rapidly change the pressure level since metering positions of the bimetal arms are not relied on, but rather the respective ports 76 or 78 are placed in full communication with the interior chamber 64 until the pressure level within the interior chamber 64 and actuator 34 reaches the new stabilized value. This is contrasted with the metering arrangements disclosed and typified in the Amano patent referred to above in which the bimetal actuator according to the present device cannot be used since graduated metering positioning of the actuating device is in accordance with the electrical signals. Such opened or closed condition is time based, i.e., lasts as long as there is non-correspondence between the input varying electrical signal and the sensed pressure level.

Figure 4:
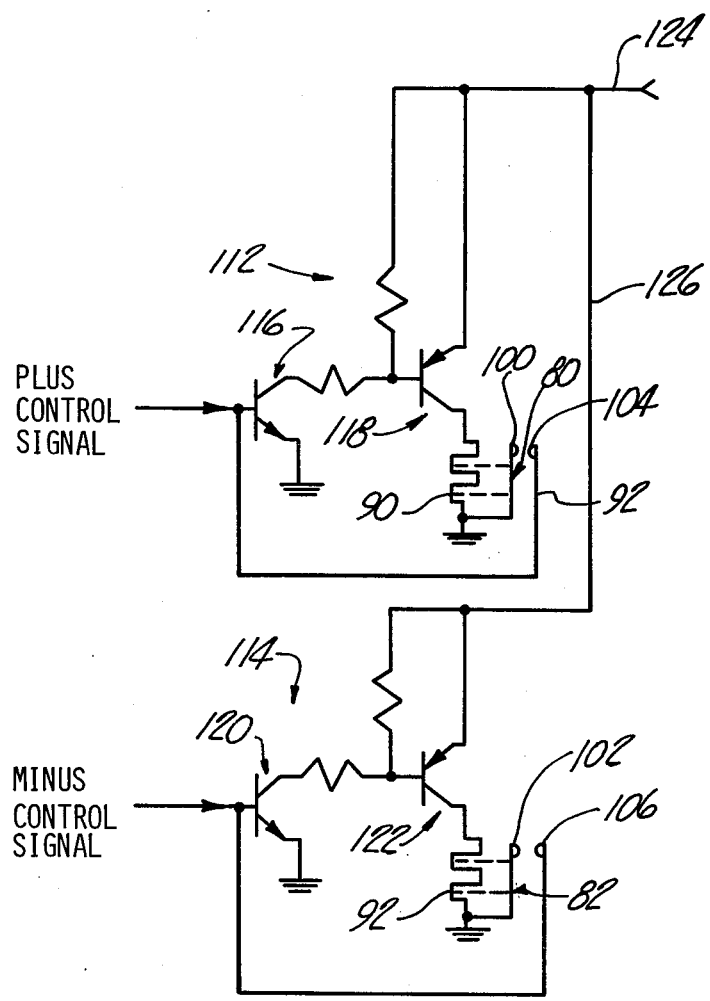
FIG. 4 is a schematic circuit diagram of appropriate circuitry to be utilized in conjunction with the pressure transducer shown in FIG. 2.

Referring to FIG. 4, a suitable heater circuitry allowing for the interruption upon grounding contact is disclosed. The heater control circuitry 98 comprises a pair of branches 112 and 114 associated with the heater winding 90 and 92, respectively. Each branch includes a pair of transistors 116 and 118, and 120 and 122. The first transistors 116 and 120 have applied to their base by the differential amplifier, a signal of the appropriate sense, i.e., the control signal calling for a higher pressure level applied to the base of transistor 120, and the control signal calling for a lower pressure level applied to the base of transistor 116. In the presence of an electrical control signal at the base of either transistor 116 and 120, the transistor 118 or 122 is rendered conductive to allow an applied input voltage to cause a current flow via line 124 passing through the heater winding 90 to the ground connection shown. Upon engagement of the contacts 104 and 100, the base of transistor 116 is connected to turn off transistor 118 and interrupting the heater circuit current. Similarly, with respect to branch 114, when the base of the transistor 122 receives a control signal from the differential amplifier, the transistor 122 is turned on and the input voltage via line 124, 126 is applied to the heater winding 92 and conducted to ground as shown. Upon engagement of the contacts 106 and 102, the base of the transistor 120 is connected to cause the transistor 122 to be turned off, interrupting the flow of current through the heater windings 92. Upon breaking of the contacts 106 and 102, if a control signal is still present at the base of the transistor 116 or 120, the transistors 118 and 122 are again turned on to cause a current to flow in the heater windings 90 or 92 as described.

This arrangement provides a simple efficient solid state heater control circuit although many circuit arrangements of course are possible.

Accordingly, it can be seen that the automatic temperature control system of FIG. 1 utilizing this pressure transducer produces a simplified low cost means for converting the electrical error signal into a corresponding pressure level for proper positioning of the blend air door 30 which is highly reliable in operation and rapid in response to meet all of the system requirements for this particular application. Many variations of the specifics shown are of course possible since, as for example, the bimetal arms can be configured in many different mounting arrangements other than the single strip dual cantilevered arm arrangement shown and other circuit arrangements providing a means creating a circuit interruption upon a predetermined travel of the bimetal arm. In addition, the interrupted heater current bimetal actuator devices may be utilized in other contexts and for other applications than pressure transducers in which a rapid response is of importance requiring or rendering desirable the use of relatively high heater currents.

It should also be noted that any means for nulling the electrical error signals upon movement of the operating member into its corresponding position may be used with the pressure transducing arrangement according to the present invention other than the disclosed pressure sensor feedback. That is, the Weaver et al potentiometer feedback could be utilized in conjunction with the present transducer, that feedback signal in turn corresponding to the pressure level in the transducer.

The embodiments of the invention in which an exclusive property or privilege is claimed are defined as follows:

1. A pressure transducer for producing a variable fluid pressure level from at least one pressure source corresponding to the level of a varying electrical signal input, the pressure transducer comprising:
   an enclosure having an interior chamber;
   means creating a controllable communication with said interior chamber including:
   a valve port and at least one heated bimetal actuator operatively associated with said valve port, said heated bimetal actuator including a bimetal arm biased into engagement with said valve port and including means sealingly engaging said bimetal arm and said valve port;
   heater circuit means for heating said bimetal arm causing said bimetal arm to deflect away from said valve port allowing communication of said at least one pressure source with said interior chamber of said enclosure;
   means activating said heater circuit whenever the pressure level in said interior chamber varies from correspondence with said varying electrical input signal in a direction tending to be corrected by communication of said at least one pressure source with said interior chamber;
   whereby said heater circuit means is activated to cause said bimetal arm to create said communication of said at least one pressure source with interior chamber;
   means discontinuing said heating by said heater circuit means upon achievement of a pressure level in said interior chamber in correspondence with said electrical signal, whereby said bimetal arm moves to sealingly engage said valve port.

2. The pressure transducer according to claim 1 further including heater circuit interrupter means responsive to deflection of said bimetal arm to a predetermined extent sufficient to create said communication by uncovering of said valve port, said heater circuit interrupter means interrupting said heater circuit current flow whenever said bimetal arm deflects to said predetermined position.

3. The pressure transducer according to claim 2 wherein said heating circuit interrupter means produces reactivation of said heater circuit upon cooling of said bimetal arm sufficiently to move away from said predetermined position if the pressure level in said interior chamber has not reached correspondence with said electrical input signal.

4. The pressure transducer according to claim 1 wherein a pair of said bimetal arms are provided and wherein a low pressure source and a high pressure source are provided in controllable communication with said interior chamber,
   a respective one of said pair of bimetal arms operatively associated with an inlet port creating communication between said low pressure source and said high pressure source respectively and said interior chamber, whereby said pressure in said interior chamber may be increased or decreased from the pressure levels of said low pressure and high pressure source, respectively.

5. The pressure transducer according to claim 4 further including heater circuit means associated with each of said bimetal arms, each of said bimetal arms heated by a respective heater circuit means, and each of said bimetal arms being biased into sealing engagement with one of said valve ports in the absence of a heater current flow in said heater circuit means;
   means activating a respective one of said heater circuits in response to a change in said varying electrical input signal corresponding to either an increase or decrease of the pressure level existing in said interior chamber so as to activate one or the other of said heater circuit means to either increase or decrease the pressure of said interior chamber by the placing in communication of either said low pressure source or high pressure source, respectively.

6. The pressure transducer according to claim 2 wherein said means discontinuing the activation of said heater circuit means includes a pressure sensor sensing the pressure level in said interior chamber and deactivating said heater circuit means upon achievement of a pressure level therein corresponding to said level of said electrical input signal.

7. The pressure transducer according to claim 5 wherein said means discontinuing the activation of said one or the other of said heater circuit means includes a pressure sensor sensing the pressure level in said interior chamber and deactivating said one or the other of said heater circuit means upon achievement of a pressure level therein corresponding to said level of said electrical input signal.

8. The pressure transducer according to claim 3 wherein said heater circuit interrupter means comprises a contact placed in juxtaposition with said at least one bimetal arm adapted to be engaged by said movement of said bimetal arm, said engagement interrupting said current flow in said heater circuit means during engagement of said contact with said bimetal arm.

9. The pressure transducer according to claim 4 wherein said low pressure source comprises a source of vacuum pressure and wherein said relatively high pressure source comprises a source of atmospheric pressure.

10. The pressure transducer according to claim 4 wherein said bimetal arms are comprised of opposite ends of a bimetal strip and means mounting said bimetal strip at a central location, whereby each of said arms is cantilevered from said central location.

11. The pressure transducer according to claim 10 wherein each of said valve ports is placed in juxtaposition with the outer arms of each of said bimetal arms whereby movement of said cantilevered bimetal arms away from said inlet ports.

12. The pressure transducer according to claim 3 wherein said heater interrupter means comprises a control transistor creating a heater circuit current flow and means applying an electrical control signal to said transistor, and further including means interrupting said electrical control signal applied to said control transistor upon said predetermined movement of said bimetal arm into said predetermined position.

13. The pressure transducer according to claim 2 wherein said at least one bimetal arm is biased into engagement with said valve port in a range of temperatures substantially above the ambient temperatures experienced by said pressure transducer whereby said heating circuit means must heat said bimetal element substantially above ambient temperatures in order to provide unsealing of said bimetal are from said valve port.

14. An automatic temperature control system for producing a selected temperature in an enclosed space, said system comprising:
   temperature selector means for generated electrical signals corresponding to the selected temperature level;
   temperature sensor means for sensing the temperature level within said enclosed space and generating corresponding electrical signals;
   means for generating an error signal corresponding to the difference between said selector means signals and said temperature sensor signals;
   means for increasing or decreasing the temperature level in said enclosed space in response to generation of said error signal;
   said means including an actuator device having a movable output member which causes an increase or decrease in the temperature level of said enclosed space upon assuming a corresponding position;
   said means further includes means causing said movable member to assume a corresponding position in response to generation of said error signal;
   pressure transducer means producing a variable level fluid pressure including vacuum modulator means, said vacuum modulator means including means for providing intermittent communication of said vacuum modulator with a source of vacuum pressure and further including means for intermittently communicating said vacuum modulator valve with an atmospheric vent, and means controlling said intermittent communication of said vacuum source and vent source in correspondence with said signal to produce a modulated vacuum pressure corresponding to said error signal and wherein said pressure sensor means senses said modulated vacuum pressure;
   said vacuum modulator valve including a pair of heated bimetal arms and means for creating said intermittent communication of said vacuum source and said vent source corresponding to movement of a respective one of said bimetal arms and further including a heater circuit and mens producing a heating current in a respective heater circuit corresponding to said error signal in either sense of said sensed temperature difference;
   said actuator means being responsive to the level of pressure generated by said pressure transducer means to assume said corresponding position of said movable member;
   pressure sensor means generating electrical signals corresponding to said pressure level and means nulling said error signal upon movement of said output member into the corresponding position of said movable member to said error signal.

15. The automatic temperature control system according to claim 14 including means to discontinue said heating current in said respective heater circuit upon achievement of a pressure level in said vacuum modulator in correspondence with said corresponding position of said actuator movable member.

16. The automatic temperature control system according to claim 15 wherein said vacuum modulator valve further includes contacts in position with respect to each of said heated bimetal arms and further includes means interrupting said heater circuit upon movement of each of said bimetal arms so as to create communication of either said vacuum source or said vent source with said vacuum modulator whereby heating of said bimetal elements is interrupted.

* * * * *